United States Patent
Koizumi et al.

(10) Patent No.: US 11,841,665 B2
(45) Date of Patent: Dec. 12, 2023

(54) IMAGE FORMING APPARATUS

(71) Applicant: CANON KABUSHIKI KAISHA, Tokyo (JP)

(72) Inventors: Kazuhisa Koizumi, Chiba (JP); Fumitaka Sobue, Chiba (JP); Yosuke Hata, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/056,657

(22) Filed: Nov. 17, 2022

(65) Prior Publication Data
US 2023/0168619 A1    Jun. 1, 2023

(30) Foreign Application Priority Data
Nov. 29, 2021 (JP) ................. 2021-192913

(51) Int. Cl.
*G03G 15/00* (2006.01)
*B41J 11/00* (2006.01)

(52) U.S. Cl.
CPC ............ *G03G 15/70* (2013.01); *B41J 11/006* (2013.01)

(58) Field of Classification Search
CPC ......... B41J 11/006; G03G 2215/00552; G03G 2221/1675; G03G 21/1638; G03G 15/00548; B65H 2220/01; B65H 2511/528
See application file for complete search history.

(56) References Cited

U.S. PATENT DOCUMENTS

| | | | | |
|---|---|---|---|---|
| 3,999,851 A | * | 12/1976 | Sakamaki | G03G 15/70 399/21 |
| 4,156,112 A | * | 5/1979 | Moreland | G08C 15/12 370/503 |
| 2005/0280694 A1 | * | 12/2005 | Tsujino | B41J 2/45 347/238 |
| 2016/0378048 A1 | | 12/2016 | Sugawara | |
| 2017/0374226 A1 | * | 12/2017 | Sano | H04N 1/03 |

\* cited by examiner

*Primary Examiner* — David H Banh
(74) *Attorney, Agent, or Firm* — Canon U.S.A., Inc. I.P. Division

(57) ABSTRACT

An image forming apparatus includes a connector, a conveyance unit, and a controller. The conveyance unit includes first and second sensors, first and second light sources, and a capacitor. Based on the first and second sensors, the controller determines a position of a paper jam having occurred during an image formation job. The first light source is turned-on when the position of the paper jam corresponds to a position of the first sensor and the second light source is turned-on when the position of the paper jam corresponds to a position of the second sensor. When the conveyance unit is pulled out of the image forming apparatus, the connector shuts off the electrical connection between the conveyance unit and a power source, and a light source controlled to turn on by the controller glows based on electric power accumulated in the capacitor during the image formation job.

4 Claims, 5 Drawing Sheets

IMAGE FORMING APPARATUS

BACKGROUND

Field

The present disclosure relates to an image forming apparatus that notifies the position of a recording medium remaining in the apparatus.

Description of the Related Art

There has been conventionally known a configuration in which a drawer unit including a conveyance path is pulled out from an image forming apparatus so that a recording medium remaining in the image forming apparatus can be removed. United States Patent Application Publication No. 2016/0378048 describes a configuration in which an LED on a drawer unit glows to notify the user of the position of a recording medium remaining in the conveyance path of the drawer unit pulled out from the image forming apparatus. Specifically, according to United States Patent Application Publication No. 2016/0378048, a capacitor accumulating electric power is provided in a circuit including the LED so that the LED can glow even if the drawer unit is pulled out from the image forming apparatus. When the drawer unit is pulled out from the image forming apparatus, the LED glows on the electric power accumulated in the capacitor.

The configuration of United States Patent Application Publication No. 2016/0378048 includes the LED with an additional capacitor for turning on the LED, making the circuit scale provided in the drawer unit larger. In addition, this increases the cost of the image forming apparatus.

SUMMARY

The present disclosure is directed to notifying the position of a paper jam having occurred in an image forming apparatus with a less expensive configuration.

According to an aspect of the present disclosure, an image forming apparatus to form an image on a recording medium includes a connector configured to be connected to a power source, a conveyance unit configured to be pulled out from the image forming apparatus, and a controller, wherein the conveyance unit includes a conveyance roller configured to convey the recording medium, a conveyance path configured to guide the recording medium conveyed by the conveyance roller, a first sensor provided at a first position in a conveyance direction in which the recording medium is conveyed, a first light source provided in correspondence with the first sensor, a second sensor provided at a second position in the conveyance direction, a second light source provided in correspondence with the second sensor, and a capacitor configured to reduce fluctuation of a voltage supplied from the power source via the connector to a motor configured to drive the conveyance roller, wherein the controller is configured to perform operations including determining, based on the first sensor and the second sensor, a position of a paper jam having occurred during an image formation job of forming the image on the recording medium, and controlling the first light source to turn on in a case where the determined position of the paper jam corresponds to the first position of the first sensor, and controlling the second light source to turn on in a case where the determined position of the paper jam corresponds to the second position of the second sensor, wherein, in a case where the conveyance unit is pulled out from the image forming apparatus, electrical connection between the conveyance unit and the power source by the connector is shut off, and wherein, in a state where the conveyance unit is pulled out from the image forming apparatus, a light source controlled to turn on by the controller glows based on electric power accumulated in the capacitor during the image formation job.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. However, the shapes, relative arrangements, and the like of components of the exemplary embodiments can be changed as appropriate depending on the configuration of the apparatus to which the present disclosure is applied and various conditions, and the scope of the present disclosure is not limited to the following exemplary embodiments.

[Image Forming Apparatus]

Figure 1:
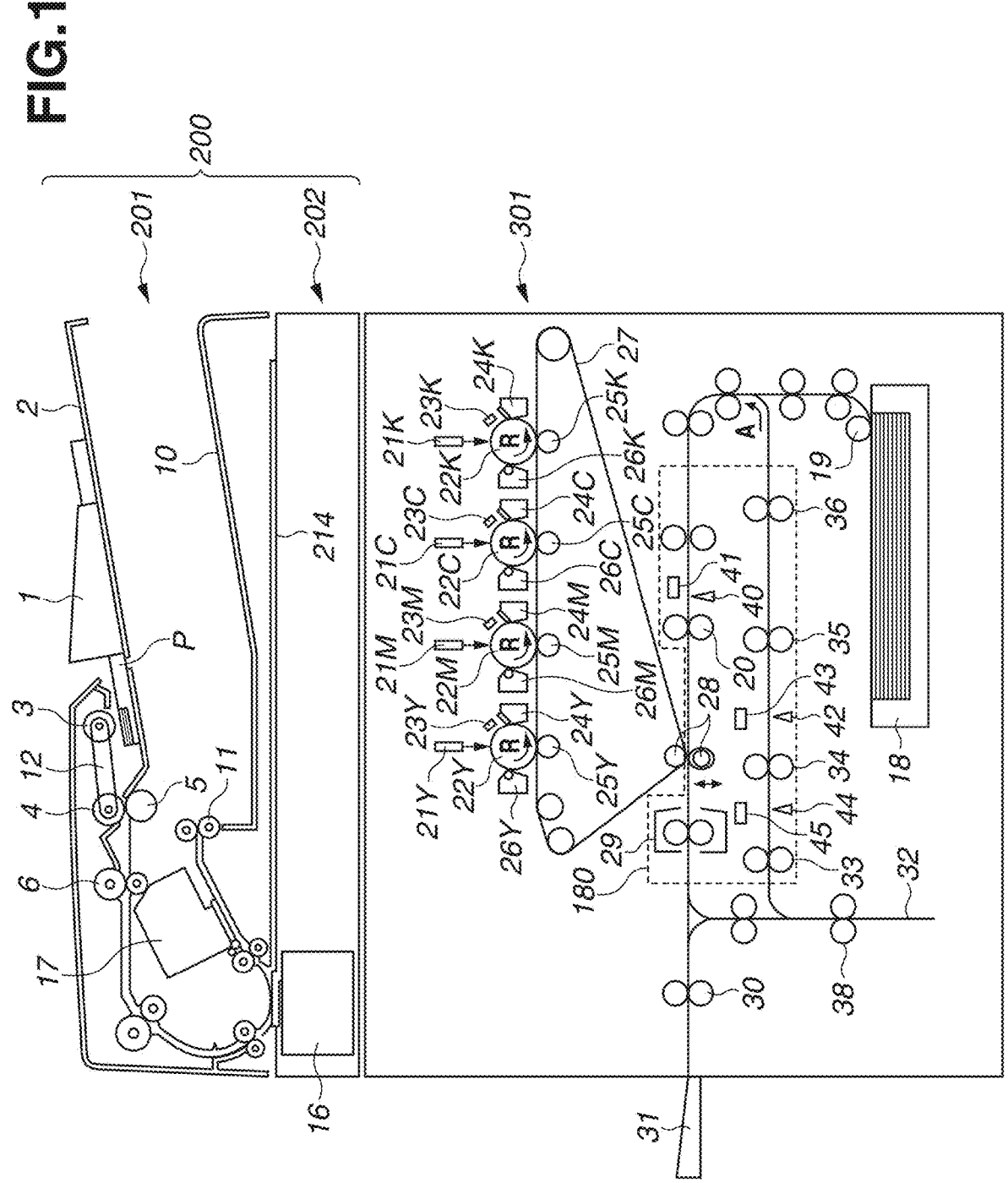
FIG. 1 is a cross-sectional view of an image forming apparatus.

A first exemplary embodiment will be described. FIG. 1 is a cross-sectional view of an electrophotographic color copy machine (hereinafter, referred to as image forming apparatus) 100 used in the present exemplary embodiment. The image forming apparatus is not limited to a copy machine and may be a facsimile machine, a printing machine, a printer, or the like. The recording system is not limited to the electrophotographic system and may be the inkjet system, for example. The type of the image forming apparatus may be a monochrome type or a color type.

Hereinafter, a configuration and functions of the image forming apparatus 100 will be described with reference to FIG. 1. As illustrated in FIG. 1, the image forming apparatus 100 includes a document reading device 200 including a document feeding device 201 and a reading device 202, and an image printing device 301.

<Document Reading Device>

Documents P placed on a document stacking unit 2 of the document feeding device 201 are fed one by one by a pickup roller 3 and then are conveyed downstream by a feed roller 4. A separation roller 5 is provided at a position opposed to the feed roller 4 and is in pressure-contact with the feed roller 4. The separation roller 5 is configured to be rotated when a load torque greater than or equal to a predetermined torque is applied to the separation roller 5. The separation roller 5 has the function of separating two documents fed in an overlapping state.

The pickup roller 3 and the feed roller 4 are coupled together by a swing arm 12. The swing arm 12 is supported by the rotation shaft of the feed roller 4 so that the swing arm 12 can turn around the rotation shaft of the feed roller 4.

The documents P are conveyed by the feed roller 4 and other conveyance members and discharged by a discharge roller 11 into a discharge tray 10.

The reading device 202 is provided with a document reading unit 16 that reads an image on a first side of the conveyed document. The image information read by the document reading unit 16 is output to the image printing device 301.

The document feeding device 201 is provided with a document reading unit 17 that reads an image on a second side of the conveyed document. The image information read by the document reading unit 17 is output to the image printing device 301 in the same manner as described above related to the document reading unit 16.

As described above, the documents are read.

As the modes of reading documents, there are a first reading mode and a second reading mode. The first reading mode is a mode of reading an image on a document conveyed in the manner described above. The second reading mode is a mode of reading an image on a document placed on a document glass 214 of the reading device 202 by the document reading unit 16 traveling at a constant speed. In general, images on sheet documents are read in the first reading mode, and images on bound documents such as books and booklets are read in the second reading mode.

<Image Printing Device>

A sheet storage tray 18 storing recording media is provided in the image printing device 301. The recording media are media on which images are to be formed by the image forming apparatus. Examples of the recording media include paper sheets, resin sheets, cloth, overhead projector (OHP) sheets, and labels.

The recording media stored in the sheet storage tray 18 are fed by a pickup roller 19, conveyed by conveyance rollers in a conveyance direction, and delivered to a registration roller 20.

Image signals output from the document reading device 200 are input to optical scanning devices 21Y, 21M, 21C, and 21K including a semiconductor laser and a polygon mirror by color. Specifically, an image signal related to yellow output from the document reading device 200 is input to an optical scanning device 21Y, and an image signal related to magenta output from the document reading device 200 is input to an optical scanning device 21M. An image signal related to cyan output from the document reading device 200 is input into an optical scanning device 21C, and an image signal related to black output from the document reading device 200 is input to an optical scanning device 21K. Hereinafter, a configuration for forming a yellow image will be described, but similar configurations each are applied to magenta, cyan, and black images.

The outer circumferential surface of a photoconductive drum 22Y as a photoconductor is charged by a charger 23Y. After the charging of the outer circumferential surface of the photoconductive drum 22Y, laser light based on the image signal input from the document reading device 200 to the optical scanning device 21Y is emitted from the optical scanning device 21Y to the outer circumferential surface of the photoconductive drum 22Y through an optical system including a polygon mirror and a mirror. As a result, an electrostatic latent image is formed on the outer circumferential surface of the photoconductive drum 22Y.

Subsequently, the electrostatic latent image is developed with toner in a development device 24Y as a development unit, and a toner image is formed on the outer circumferential surface of the photoconductive drum 22Y. The toner image formed on the photoconductive drum 22Y is transferred onto a transfer belt 27 by a transfer roller 25Y provided at a position facing the photoconductive drum 22Y. After the transfer of the toner image to the transfer belt 27, the residual toner on the outer circumferential surface of the photoconductive drum 22Y is collected with a cleaning unit 26Y.

The toner images of yellow, magenta, cyan, and black having been transferred onto the transfer belt 27 as a transfer unit are transferred onto the recording medium by a transfer roller pair 28. A high voltage is applied to the transfer roller pair 28, and the toner images are transferred onto the recording medium due to the high voltage. In synchronization with this transfer timing, the registration roller 20 feeds the recording medium into the transfer roller pair 28.

As described above, the recording medium onto which the toner images have been transferred is fed to a fuser 29 that is a fusing unit, and is heated and pressed by the fuser 29 so that the toner images are fixed to the recording medium. In this manner, an image is formed on the recording medium by the image forming apparatus 100.

In image formation in a single-sided print mode, the recording medium having passed through the fuser 29 is discharged onto the discharge tray 31 by a discharge roller 30. In image formation in a double-sided print mode, a fusing process is performed on the first side of the recording medium by the fuser 29, and then the recording medium is transferred to a reverse path 32 by a reverse roller 38. The recording medium having been transferred to the reverse path 32 is reversed between the first side and the second side by the reverse roller 38, and is conveyed to a transfer guide provided with conveyance rollers 33, 34, 35, and 36. The recording medium is conveyed again to the registration roller 20 by the conveyance rollers 33, 34, 35, 36, and an image is formed on the second side of the recording medium by the method described above. After that, the recording medium is discharged to the discharge tray 31 by the discharge roller 30.

The image printing device 301 according to the present exemplary embodiment is provided with a front door 302 to be opened for the user to access inside the image printing device 301. When the front door 302 is opened, a drawer unit 180 as a conveyance unit is exposed. The drawer unit 180 can be pulled out from the image printing device 301.

As illustrated in FIG. 1, in the drawer unit 180, a sensor 40 detecting whether a recording medium is present is provided on a conveyance path on which the recording medium is conveyed, and an LED 41 as a light source for illuminating the position of the sensor 40 (the position of a paper jam) is provided at a position corresponding to the sensor 40. In addition, in the drawer unit 180, a sensor 42 detecting whether a recording medium is present is provided on a conveyance path on which the recording medium is conveyed, and an LED 43 illuminating the position of the sensor 42 is provided at a position corresponding to the sensor 42. In the drawer unit 180, a sensor 44 detecting whether a recording medium is present is provided on the conveyance path on which the recording medium is conveyed, and an LED 45 illuminating the position of the sensor 44 is provided at a position corresponding to the sensor 44. The sensors and the LEDs will be described below in detail. Four or more sensors and LEDs may be provided on the conveyance path in the drawer unit 180. The sensors are included in sensors 159 described below.

The configuration and functions of the image forming apparatus 100 have been described above.

<Control Configuration of Image Forming Apparatus>

Figure 2:
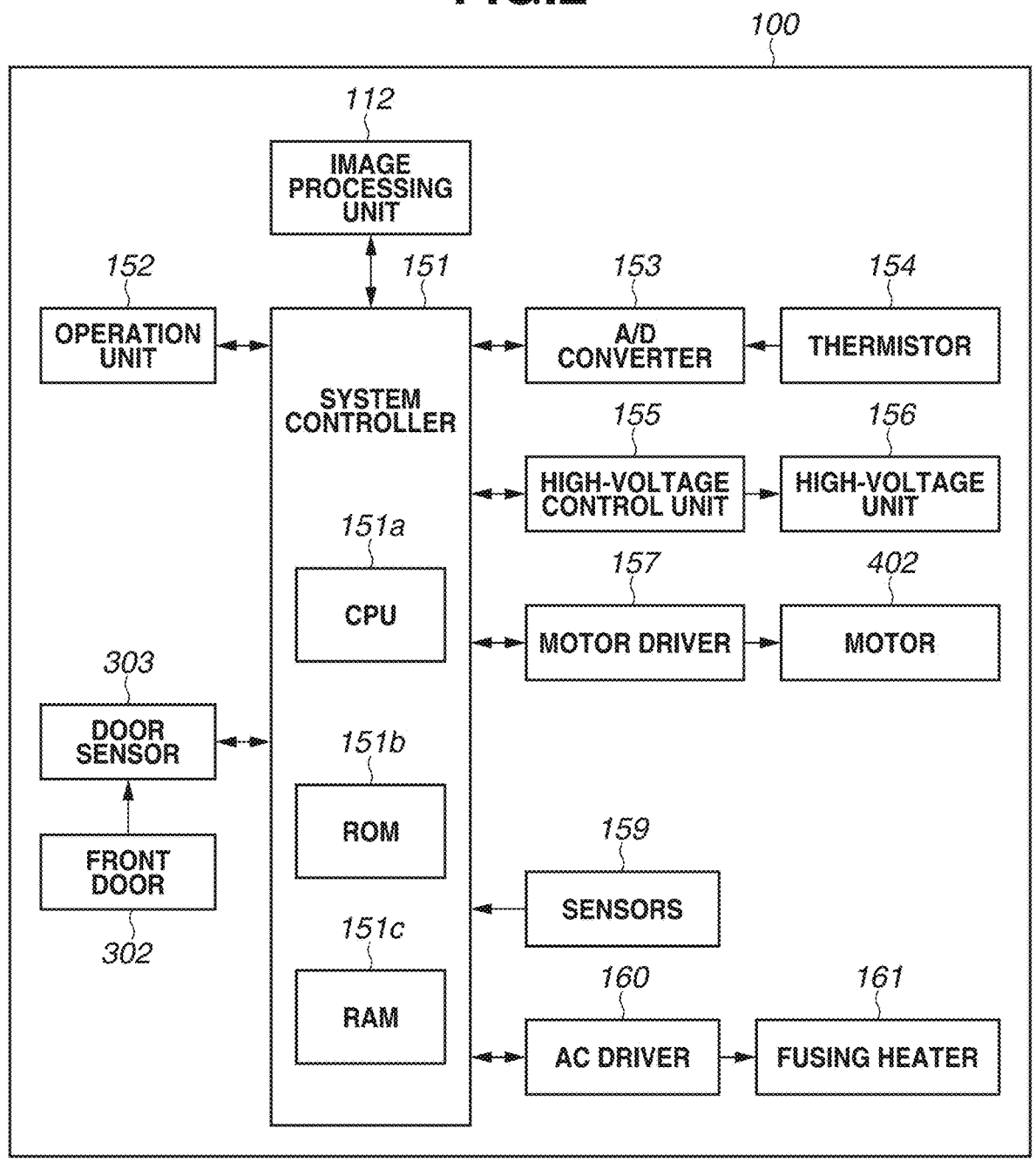
FIG. 2 is a block diagram illustrating a control configuration of the image forming apparatus.

FIG. 2 is a block diagram illustrating an example of a control configuration of the image forming apparatus 100. A system controller 151 includes a central processing unit (CPU) 151a, a read-only memory (ROM) 151b, and a random access memory (RAM) 151c as illustrated in FIG. 2. The system controller 151 is connected to an image processing unit 112, an operation unit 152, an analog/digital (A/D) converter 153, a high voltage controller 155, a motor driver 157, the sensors 159, an alternating-current (AC) driver 160, and a door sensor 303. The system controller 151 can transmit and receive data and commands to and from the connected units.

The CPU 151a performs various sequences related to a predetermined image formation sequence by reading and running various programs stored in the ROM 151b.

The RAM 151c is a storage device. The RAM 151c stores various types of data such as setting values for the high voltage controller 155, command values for the motor driver 157, and information received from the operation unit 152, for example.

The system controller 151 transmits setting value data about various devices provided in the image forming apparatus 100, the data of which is used in image processing by the image processing unit 112, to the image processing unit 112. The system controller 151 further receives signals from the sensors 159 and sets setting values for the high voltage controller 155 based on the received signals.

The high voltage controller 155 supplies voltages to the high voltage units 156 (including chargers 23Y, 23M, 23C, and 23K, developers 24Y, 24M, 24C, and 24K, and the transfer roller pair 28) for the setting values set by the system controller 151.

The motor driver 157 controls a motor 402 that drives a load (in the present exemplary embodiment, the registration roller 20 as an example) provided in the drawer unit 180 in response to a command output from the CPU 151a. FIG. 2 illustrates one motor, but in reality, two or more motors are provided in the image forming apparatus 100. In addition, FIG. 2 illustrates one motor driver, but in reality, two or more motor drivers are provided in the image forming apparatus 100.

The A/D converter 153 receives a detection signal detected by a thermistor 154 for detecting the temperature of a fusing heater 161, converts the analog detection signal to a digital signal, and transmits the digital signal to the system controller 151. The system controller 151 controls an AC driver 160 based on the digital signal received from the A/D converter 153. The AC driver 160 controls the fusing heater 161 in such a manner that the temperature of the fusing heater 161 reaches a temperature for performing the fusing process. The fusing heater 161 is a heater that is used in the fusing process and is included in the fuser 29.

The system controller 151 controls the operation unit 152 to display an operation screen for the user to set the type of the recording medium to be used (hereinafter, referred to as paper type) and other types of information on the display unit provided in the operation unit 152. The system controller 151 receives the user setting information from the operation unit 152, and controls an operation sequence of the image forming apparatus 100 based on the user setting information. The system controller 151 also transmits the information indicating the state of the image forming apparatus 100 to the operation unit 152. The information indicating the state of the image forming apparatus 100 is information relating to the number of images to be formed, a proceeding status of the image forming operation, a jam and a multi-feed of sheets having occurred at the document feeding device 201 and the image printing device 301, for example. The operation unit 152 displays the information received from the system controller 151 on the display unit.

As described above, the system controller 151 controls the operation sequence of the image forming apparatus 100.

[Circuit Configuration of Drawer Unit]

Next, a circuit configuration of the drawer unit 180 according to the present exemplary embodiment will be described. According to the present exemplary embodiment, the configuration described below allows a notification of the position of the residual recording medium in the image forming apparatus with low cost.

Figure 3:
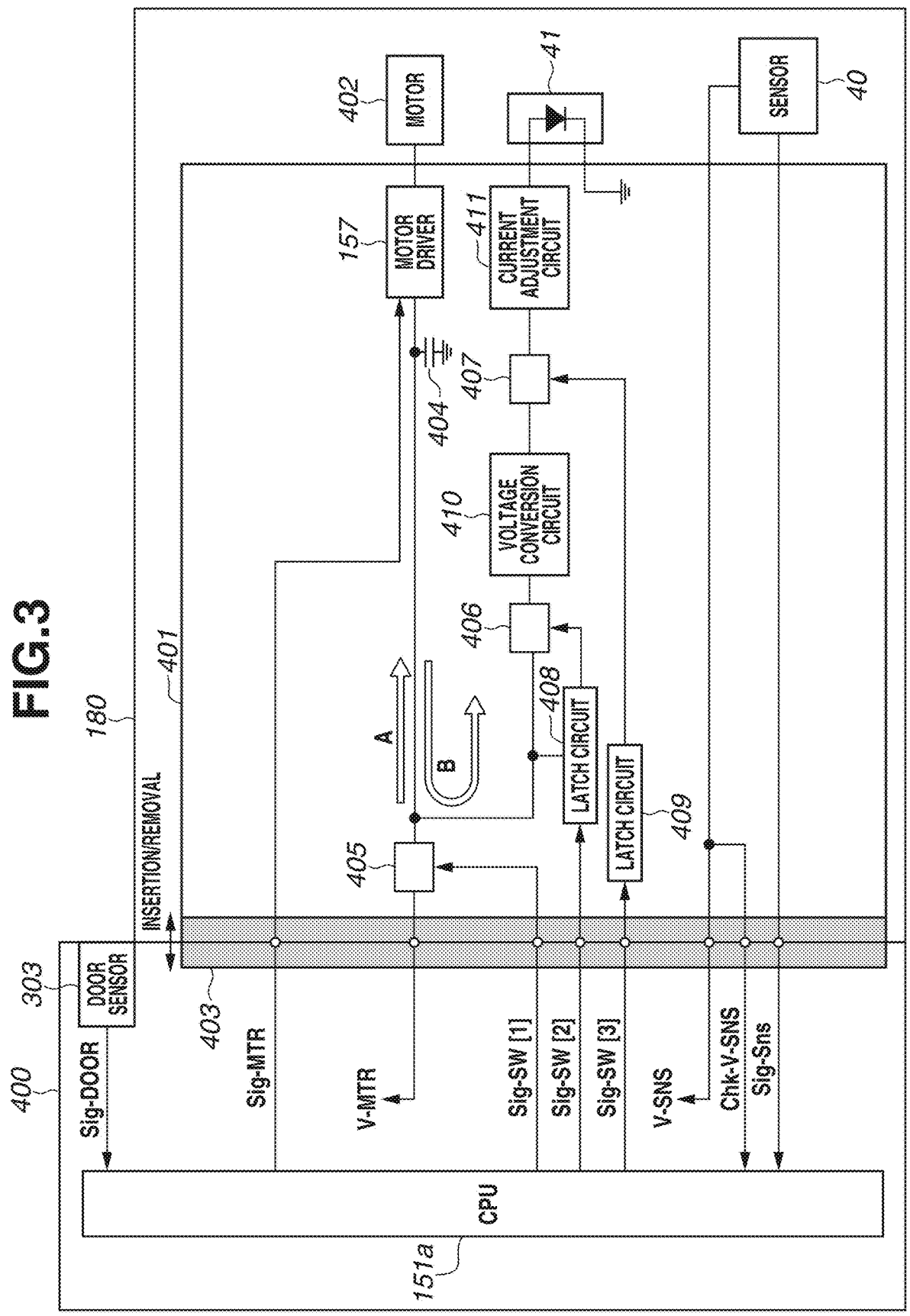
FIG. 3 illustrates the circuit configuration of a drawer unit in a first exemplary embodiment.

FIG. 3 illustrates the circuit configuration of the drawer unit 180. Hereinafter, illumination of the LED 41 will be described. However, the configuration of one or more drive circuits provided in the corresponding LEDs in the drawer unit 180 are similar to the configuration of the drive circuit that drives the LED 41, and thus descriptions thereof will be omitted.

As illustrated in FIG. 3, according to the present exemplary embodiment, a circuit board 400 provided with the CPU 151a and a circuit board 401 provided with a circuit for driving the motor 402 and the LED 41 are connected via a connector 403. When the drawer unit 180 is pulled out from the image printing device 301, the circuit board 401 is separated from the connector 403 so that electrical connection between the circuit board 400 and the circuit board 401 is shut off.

A voltage is supplied from a power source V-MTR to the motor 402 via the connector 403, a switch 405, and the motor driver 157. A capacitor 404 is provided to reduce the fluctuation of the voltage supplied to the motor 402 between the connector 403 and the motor driver 157. Specifically, the capacitor 404 is provided between a switch 405 and the motor driver 157 on the power path to reduce the fluctuation of the voltage supplied to the motor 402. The motor driver 157 operates based on a control signal Sig-MTR output from the CPU 151a to control the motor 402.

The sensor 40 operates on a voltage from a power source V-SNS via the connector 403. A detection result Sig-SNS from the sensor 40 is output to the CPU 151a. The CPU 151a determines whether the recording medium is present at a position corresponding to the sensor 40, based on the detection result Sig-SNS.

The voltage output from the power source V-SNS to the circuit board 401 via the connector 403 is input as a voltage Chk-V-SNS to the CPU 151a via the connector 403. This configuration allows the CPU 151a to determine whether the drawer unit 180 has been pulled out based on the voltage Chk-V-SNS. Specifically, if the voltage Chk-V-SNS is lower than a predetermined value, the CPU 151a determines that the drawer unit 180 has been pulled out from the image printing device 301 (in a state where the electrical connection between the circuit board 400 and the circuit board 401 is shut off). If the voltage Chk-V-SNS is larger than the predetermined value, the CPU 151a determines that the drawer unit 180 is installed to the image printing device 301 (the circuit board 400 and the circuit board 401 are electrically connected). According to the present exemplary embodiment, it is determined whether the drawer unit 180 has been pulled out based on the voltage Chk-V-SNS, but the present disclosure is not limited to this configuration. For example, a sensor for determining whether the drawer unit 180 has been pulled out may be added to the circuit board 401. However, the configuration where it is determined whether the drawer unit 180 has been pulled out based on the voltage Chk-V-SNS makes it possible to determine whether the drawer unit 180 has been pulled out with lower cost.

As illustrated in FIG. 3, the circuit board 401 according to the present exemplary embodiment is provided with switches 405, 406, and 407 as switching devices. The switches 405, 406, and 407 may be field effect transistors (FETs) or one or more relay circuits.

The switch 405 is turned on or off according to a signal Sig-SW[1] output from the CPU 151a. The switch 406 is turned on or off according to a signal Sig-SW[2] output from the CPU 151a. The signal Sig-SW[2] is input to the switch 406 via a latch circuit 408. The switch 407 is turned on or off according to a signal Sig-SW[3] output from the CPU 151a. The signal Sig-SW[3] is input to the switch 407 via a latch circuit 409. The functions of the one or more latch circuits 408 and 409 will be described below.

With the circuit board 400 and the circuit board 401 electrically connected to each other, the CPU 151a turns on the switch 405 and turns off the switches 406 and 407 in driving the motor 402. As a result, the voltage output from the power source V-MTR is supplied to the motor 402 (arrow A in FIG. 3). This enables the control of the motor 402 by the motor driver 157. The capacitor 404 accumulates electric power during an image formation job. With the circuit board 400 and the circuit board 401 electrically connected to each other, the CPU 151a may turn off the switches 405, 406, and 407 when the motor 402 is not being driven.

According to the present exemplary embodiment, the LED 41 glows based on the electric power accumulated in the capacitor 404 as described below. Specifically, the voltage output from the capacitor 404 is input to a voltage conversion circuit 410 via the sensor 406 (arrow B in FIG. 3). The voltage conversion circuit 410 converts the voltage output from the capacitor 404 into a voltage on which the LED 41 can be operated.

The voltage output from the voltage conversion circuit 410 is input to a current adjustment circuit 411 via the switch 407. The current adjustment circuit 411 adjusts the electric current to be supplied to the LED 41 based on the voltage output from the voltage conversion circuit 410.

Figure 4:
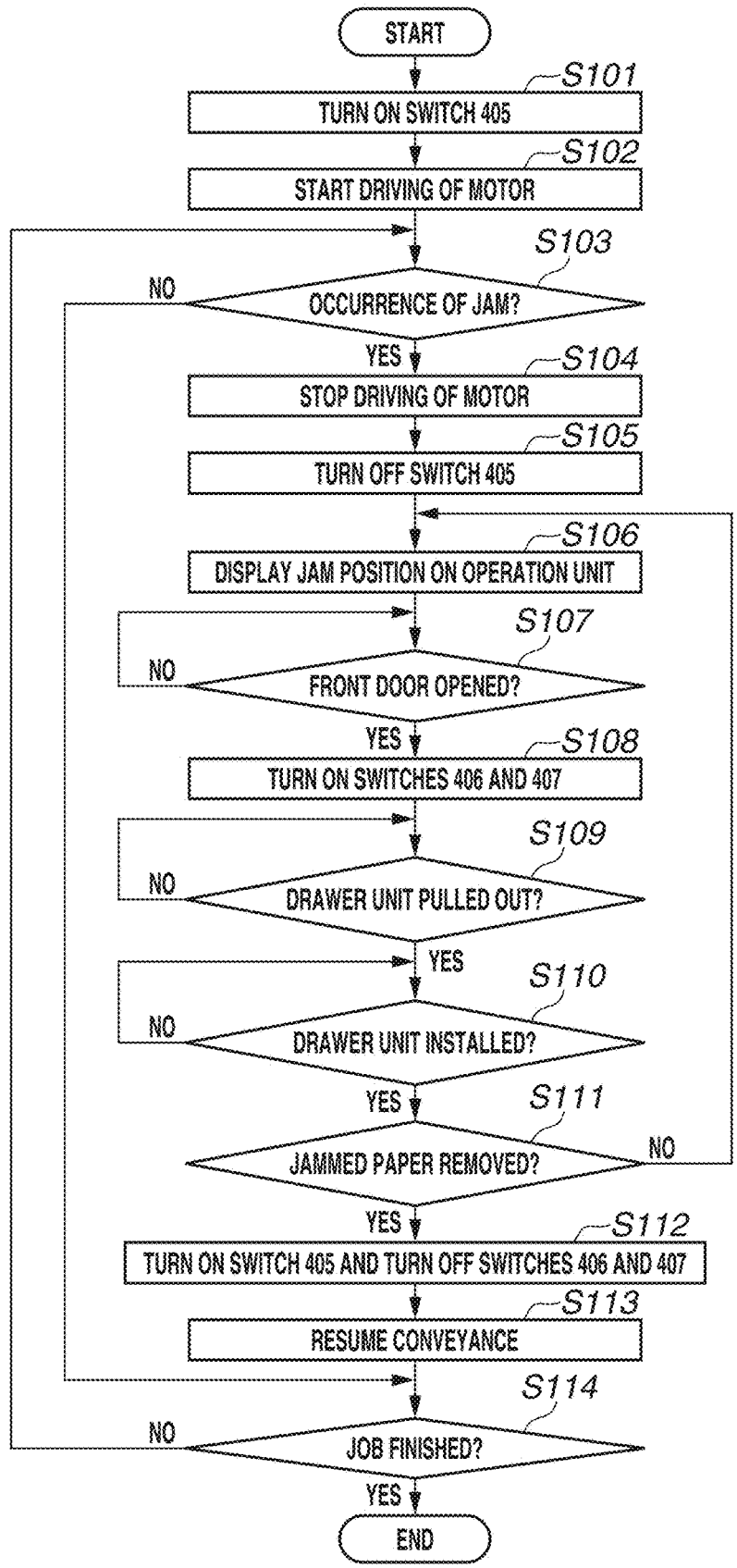
FIG. 4 is a flowchart illustrating a method for turning on an LED.

FIG. 4 is a flowchart illustrating a method for turning on the LED 41. The method for turning on the LED 41 will be described with reference to FIG. 4. The processing in this flowchart is performed by the CPU 151a, and begins at the start of an image formation job. An instruction to start an image formation job is input to the CPU 151a via the operation unit 152, for example. The following is a description about a case of the occurrence of a paper jam at a position corresponding to the sensor 40.

In response to the start of the image formation job, in step S101, the CPU 151a turns on the switch 405. The voltage output from the power source V-MTR is supplied to the motor 402 (arrow A in FIG. 3). This enables the control of the motor 402 by the motor driver 157. In addition, electric power is accumulated in the capacitor 404.

In step S102, the CPU 151a controls the motor driver 157 to drive the motor 402. That is, the CPU 151a starts conveyance of the recording medium.

In step S103, if the CPU 151a determines that no paper jam has occurred (NO in step S103), the processing proceeds to step S114.

On the other hand, in step S103, if the CPU 151a determines that a paper jam has occurred (YES in step S103), the processing proceeds to step S104. In step S104, the CPU 151a controls the motor driver 157 to stop the motor 402 and cease excitation of the winding wire of the motor 402. That is, the CPU 151a stops the conveyance of the recording medium. The CPU 151a determines that a paper jam has occurred if no recording medium has been detected by the sensor 40 even after the lapse of a predetermined time since the detection of the recording medium by the sensor 42, for example. That is, the CPU 151a functions as a determination unit.

In step S105, the CPU 151a turns off the switch 405. That shuts off the electric power from the power source V-MTR.

In step S106, the CPU 151a notifies the position of the paper jam to the user by display on the operation unit. For example, the CPU 151a may make a notification via a display of prompting the user to open the front door 302 and pull out the drawer unit 180.

In step S107, if the CPU 151a determines that the front door 302 has been opened (YES in step S107), the processing proceeds to step S108. In step S108, the CPU 151a turns on the switches 406 and 407. That starts to supply electric power from the capacitor 404 to the LED 41 via the voltage conversion circuit 410 and the current adjustment circuit 411, turning on the LED 41. According to the present exemplary embodiment, the switch 406 is left ON by the latch circuit 408, and the sensor 407 is left ON by the latch circuit 409. As a result, even if the drawer unit 180 is pulled out from the image printing device 301, the switches 406 and 407 are left ON. That is, even if the drawer unit 180 is pulled out from the image printing device 301, the LED 41 glows. The CPU 151a determines whether the front door 302 has been opened based on a signal Sig-DOOR output from the door sensor 303. A known method is used for a configuration in which it is determined by the door sensor 303 whether the front door 302 has been opened or not (open/closed state), for example.

In step S109, if the CPU 151a determines that the drawer unit 180 has been pulled out (YES in step S109), the processing proceeds to step S110.

In step S110, if the CPU 151a determines that the drawer unit 180 has been installed (YES in step S110), the processing proceeds to step S111.

In step S111, if the CPU 151a determines that the recording medium remains at the position corresponding to the sensor 40 (the position of occurrence of the paper jam) (NO in step S111), the processing returns to step S106.

On the other hand, in step S111, if the CPU 151a determines that the recording medium has been removed from the position corresponding to the sensor 40 (YES in step S111), in step S112, the CPU 151a turns on the switch 405 and turns off the switches 406 and 407.

In step S113, the CPU 151a resumes the image formation operation (the conveyance of the recording medium).

In step S114, if the CPU 151a determines that the job has not yet been ended (NO in step S114), the processing returns to step S103.

On the other hand, in step S114, if the CPU 151a determines that the job has been ended (YES in step S114), the processing in the flowchart is ended.

In the foregoing, the case where a paper jam has occurred at the position corresponding to the sensor 40 has been described. However, if a paper jam has occurred at the position corresponding to the sensor 42, for example, similar processing is performed on the LED 43.

As described above, according to the present exemplary embodiment, the LED 41 glows based on electric power accumulated in a capacitor for reducing the fluctuation of voltage supplied to the motor 402. That is, the capacitor for reducing the fluctuation of voltage supplied to the motor 402 is also used as the storage battery for turning on the LED 41. This eliminates the need to add a separate capacitor for turning on the LED 41, and this configuration with lower cost allows a notification of the position of a paper jam having occurred in the image forming apparatus.

According to the present exemplary embodiment, the front door 302 is first opened and then the LED 41 glows. That is, the LED 41 glows when the user removes the residual recording medium in the drawer unit 180. This makes it possible to consume the electric power accumulated in the capacitor 404 without waste in comparison with the case where the LED 41 glows before the opening of the front door 302, so that the lifetime of the LED 41 can be prolonged as much as possible.

The configuration for turning on the LED according to the present exemplary embodiment is not limited to the drawer unit 180, and a configuration in which a conveyance path unit can be pulled out from the image printing device 301 is also applicable.

The transfer roller pair 28, the fuser 29, and other units are included in the image formation unit.

A second exemplary embodiment will be described. Description of the components of an image forming apparatus 100 in the present exemplary embodiment similar to the corresponding components of the image forming apparatus 100 according to the first exemplary embodiment will be omitted.

Figure 5:
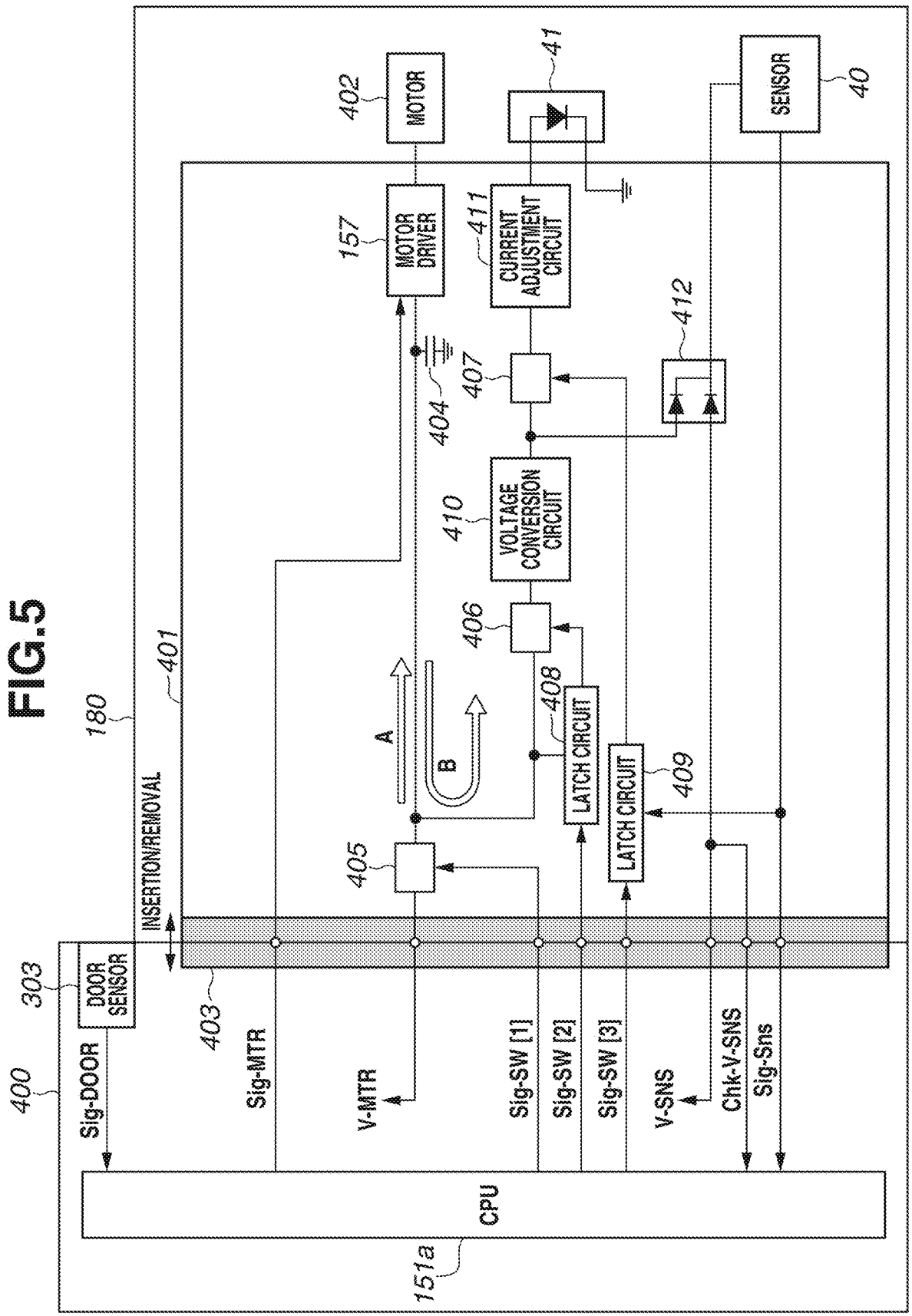
FIG. 5 illustrates the circuit configuration of a drawer unit in a second exemplary embodiment.

FIG. 5 illustrates the circuit configuration of a drawer unit 180. The following is a description of turning on an LED 41. However, the circuit configuration for driving the LEDs provided in the drawer unit 180 are similar to the circuit configuration for driving the LED 41, and thus description thereof will be omitted.

As illustrated in FIG. 5, a circuit board 401 according to the present exemplary embodiment is provided with a diode array 412. According to the present exemplary embodiment, when the drawer unit 180 is pulled out from the image printing device 301, the voltage output from a voltage conversion circuit 410 is output to a sensor 40 via the diode array 412. That is, according to the present exemplary embodiment, even if the drawer unit 180 is pulled out from the image printing device 301, the sensor 40 can operate.

According to the present exemplary embodiment, a detection result Sig-SNS from the sensor 40 is also input to a latch circuit 409. If the detection result Sig-SNS from the sensor 40 changes (from "presence of paper" to "absence of paper") due to the removal of the residual recording medium at the position corresponding to the sensor 40 by a user, the latch circuit 409 turns off a switch 407. As a result, when the user removes the residual recording medium at the position corresponding to the sensor 40, the LED 41 turns off. This configuration allows the user to check whether the recording medium is still present at the position corresponding to the sensor 40. In addition, this configuration allows consumption of the electric power accumulated in the capacitor 404 without waste in comparison with the case where the LED 41 is always glowing while the drawer unit 180 is pulled out.

According to the present disclosure, the above-described configurations with low cost allow notification of the position of a paper jam having occurred in the image forming apparatus.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192913, filed Nov. 29, 2021, which is hereby incorporated by reference herein in its entirety.

What is claimed is:

1. An image forming apparatus to form an image on a recording medium, the image forming apparatus comprising:

a connector configured to be connected to a power source;

a conveyance unit configured to be pulled out from the image forming apparatus; and a controller, wherein the conveyance unit includes:

a conveyance roller configured to convey the recording medium, a conveyance path configured to guide the recording medium conveyed by the conveyance roller, a first sensor provided at a first position in a conveyance direction in which the recording medium is conveyed, a first light source provided in correspondence with the first sensor, a second sensor provided at a second position in the conveyance direction, a second light source provided in correspondence with the second sensor, and a capacitor configured to reduce fluctuation of a voltage supplied from the power source via the connector to a motor configured to drive the conveyance roller, wherein the controller is configured to perform operations including:

determining, based on the first sensor and the second sensor, a position of a paper jam having occurred during an image formation job of forming the image on the recording medium, and controlling the first light source to turn on in a case where the determined position of the paper jam corresponds to the first position of the first sensor, and controlling the second light source to turn on in a case where the determined position of the paper jam corresponds to the second position of the second sensor, wherein, in a case where the conveyance unit is pulled out from the image forming apparatus, electrical connection between the conveyance unit and the power source by the connector is shut off, and wherein, in a state where the conveyance unit is pulled out from the image forming apparatus, a light source controlled to turn on by the controller glows based on electric power accumulated in the capacitor during the image formation job.

2. The image forming apparatus according to claim 1, further comprising:

a door configured to be opened to access an inside of the image forming apparatus; and a detector configured to detect an open or closed state of the door, wherein the conveyance unit is exposed by the door being opened, and wherein, in response to a detection by the detector of the door being opened, the controller controls the light source corresponding to the determined position of the paper jam to turn on.

3. The image forming apparatus according to claim 1, wherein the conveyance unit further includes:

a switching device provided between the capacitor and the first light source on a power path that connects the capacitor and the first light source, and a latch circuit configured to latch a state of the switching device, wherein the switching device is configured to switch between a first state where the capacitor and the first light source are connected to each other and a second state where the capacitor and the first light source are not connected to each other, wherein, in a case where the determined position of the paper jam corresponds to the first position of the first sensor with the conveyance unit installed in the image forming apparatus, the controller controls the switching device to switch from the second state to the first state to turn on the first light source, wherein, in the case where the conveyance unit is pulled out from the image forming apparatus, electrical connection between the conveyance unit and the controller also is shut off, and wherein, in the state where the conveyance unit is pulled out from the image forming apparatus, the first light source glows by the switching device being latched in the first state by the latch circuit.

4. The image forming apparatus according to claim 1, wherein the conveyance unit further includes the motor.

* * * * *